US008344233B2

(12) United States Patent
Cai et al.

(10) Patent No.: US 8,344,233 B2
(45) Date of Patent: Jan. 1, 2013

(54) SCALABLE MUSIC RECOMMENDATION BY SEARCH

(75) Inventors: Rui Cai, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 12/116,805

(22) Filed: May 7, 2008

(65) Prior Publication Data

US 2009/0277322 A1 Nov. 12, 2009

(51) Int. Cl.

| | |
|---|---|
| ***G10H 7/00*** | (2006.01) |
| ***G06F 17/00*** | (2006.01) |
| ***G06F 7/00*** | (2006.01) |

(52) U.S. Cl. ............. 84/602; 700/94; 707/747; 707/749

(58) Field of Classification Search ............ 84/600–604; 700/94; 707/736–758

See application file for complete search history.

(56) References Cited

U.S. PATENT DOCUMENTS

| | | | |
|---|---|---|---|
| 5,918,223 | A | 6/1999 | Blum et al. |
| 6,041,311 | A | 3/2000 | Chislenko et al. |
| 6,370,513 | B1 | 4/2002 | Kolawa et al. |
| 6,452,083 | B2 | 9/2002 | Pachet et al. |
| 6,504,089 | B1 | 1/2003 | Nagasawa et al. |
| 6,539,395 | B1 | 3/2003 | Gjerdingen et al. |
| 6,684,249 | B1 | 1/2004 | Frerichs et al. |
| 6,993,532 | B1 | 1/2006 | Platt et al. |
| 7,065,416 | B2 | 6/2006 | Weare et al. |
| 7,312,391 | B2 | 12/2007 | Kaiser et al. |
| 7,379,875 | B2 | 5/2008 | Burges et al. |
| 7,532,943 | B2 | 5/2009 | Weare |
| 7,548,934 | B1 | 6/2009 | Platt et al. |
| 2002/0002899 | A1 | 1/2002 | Gjerdingen et al. |
| 2002/0181711 | A1 | 12/2002 | Logan et al. |
| 2003/0177110 | A1 | 9/2003 | Okamoto et al. |
| 2005/0038819 | A1 | 2/2005 | Hicken et al. |
| 2006/0047580 | A1 | 3/2006 | Saha |
| 2006/0254411 | A1 | 11/2006 | Alcalde et al. |
| 2006/0259355 | A1 | 11/2006 | Farouki et al. |
| 2007/0078708 | A1 | 4/2007 | Yu et al. |

(Continued)

FOREIGN PATENT DOCUMENTS

JP 2006155157(A) 6/2006

(Continued)

OTHER PUBLICATIONS

Yang, Cheng. MACS: Music Audio Characteristic Sequence Indexing for Similarity Retrieval. In IEEE Workshop on Applications of Signal Processing to Audio and Acoustics, 2001.*

(Continued)

*Primary Examiner* — Elvin G Enad
*Assistant Examiner* — Andrew R Millikin
(74) *Attorney, Agent, or Firm* — Lee & Hayes, PLLC

(57) ABSTRACT

An exemplary method includes providing a music collection of a particular scale, determining a distance parameter for locality sensitive hashing based at least in part on the scale of the music collection and constructing an index for the music collection. Another exemplary method includes providing a song, extracting snippets from the song, analyzing time-varying timbre characteristics of the snippets and constructing one or more queries based on the analyzing. Such exemplary methods may be implemented by a portable device configured to maintain an index, to perform searches based on selected songs or portions of songs and to generate playlists from search results. Other exemplary methods, devices, systems, etc., are also disclosed.

17 Claims, 7 Drawing Sheets

U.S. PATENT DOCUMENTS

| | | | |
|---|---|---|---|
| 2007/0078709 | A1 | 4/2007 | Rajaram |
| 2007/0112630 | A1 | 5/2007 | Lau et al. |
| 2007/0143778 | A1 | 6/2007 | Covell et al. |
| 2007/0157795 | A1 | 7/2007 | Hung |
| 2008/0091515 | A1 | 4/2008 | Thieberger et al. |
| 2009/0222398 | A1 | 9/2009 | Allen et al. |
| 2009/0265170 | A1 | 10/2009 | Irie et al. |
| 2009/0316862 | A1 | 12/2009 | Sugimoto et al. |
| 2011/0004642 | A1 | 1/2011 | Schnitzer |
| 2011/0252947 | A1 | 10/2011 | Eggink et al. |

FOREIGN PATENT DOCUMENTS

| | | |
|---|---|---|
| JP | 2006178104(A) | 7/2006 |

OTHER PUBLICATIONS

Cai, et al., "MusicSense: Contextual Music Recommendation Using Emotional Allocation Modeling", MultiMedia 2007, Sep. 23-28, 2007, Augsburg, Bavaria, Germany, Copyright 2007.

Cai, et al., "Scalable Music Recommendation by Search", MultiMedia 2007, Sep. 23-28, 2007, Augsburg, Bavaria, Germany, Copyright 2007.

Monrovia, "Soundflavor Licenses MusicIP Acoustic Fingerprint Service", at <<http://www.musicip.com/PressReleases/Soundflavor_and_MusicIP_Partnership_Press_Release,pdf>>, Music IP, 2006, pp. 2.

Shahabi, et al., "Yoda: An Accurate and Scalable Web-based Recommendation System", available at least as early as Feb. 7, 2007, at <<http://infolab.usc.eclu/DocsDemos/COOPIS2001.pdf>>, pp. 14.

"SoundsLike", at <<http://www.idmt.fraunhofer.de/eng/research_topics/soundslike.htm>>, Fraunhofer IDMT, 2005, pp. 1.

"ZuKool Music: Personalized Music Recommendations", at <<http://www.zukool.com/>>, ZuKool Inc., 2007, pp. 3.

Knees, et al., "A Music Search Engine Built upon Audio-based and Web-based Similarity Measures", at <<http://www.cp.jku.at/research/papers/Knees_etal_sigir_2007.pdf>>, ACM, 2007, pp. 8.

Knees, et al., "Combining Audio-based Similarity with Web-based Data to Accelerate Automatic Music Playlist Generation", at <<http://www.cp.jku.at/research/papers/Knees_etal_MIR_2006.pdf>>, ACM, 2006, pp. 7.

Leshed, et al., "Understanding How Bloggers Feel: Recognizing Affect in Blog Posts", at <<http://alumni.media.mit.edu/~jofish/writing/recognizing-bloggers-affect.pdf>>, Montreal, 2006, pp. 6.

Lu, et al., "Automatic Mood Detection and Tracking of Music Audio Signals", at <<http://ieeexplore.ieee.org/Xplore/login.jsp?url=/iel5/10376/33144/01561259.pdf&arnumber=1561259>>, IEEE, vol. 14, No. Jan. 1, 2006, pp. 5-18.

Office Action for U.S. Appl. No. 12/116,855, mailed on May 13, 2011, Rui Cai, "Music Recommendation using Emotional Allocation Modeling".

Paiva, "Content-Based Classification and Retrieval of Music: Overview and Research Trends", availalbe at least as early as Nov. 14, 2007, at <<http://cisuc.dei.uc.pt/dlfile.php?fn=1124_pub_TR_(State-of-the-Art).pdf&get=1&idp=1124&ext=>>, pp. 26.

Yoshii, et al., "Hybrid Collaborative and Content-Based Music Recommendation Using Probabilistic Model with Latent User Preferences", at <<http://winnie.kuis.kyoto-u.ac.jp/~okuno/paper/ISMIR0647-Yoshii.pdf>>, University of Victoria, 2006, pp. 6.

Barrington, et al., "Semantic Similarity for Music Retrieval", Austrian Computer Society (OCG), 2007, 2 pages.

Croft, et al., "Relevance Feedback and Personalization: A Language Modeling Perspective", DELOS Workshop Personalisation and Recommender Systems in Digital Libraries, 2001, 6 pages.

Harb, et al., "A Query by Example Music Retrieval Algorithm", Digital Media Processing for Multimedia Interactive Services, Proceedings of European Workshop on Image Analysis for Multimedia Interactive Services, 2003, pp. 1-7.

Non-Final Office Action for U.S. Appl. No. 12/116,855, mailed on Nov. 25, 2011, Rui Cai et al., "Music Recommendation using Emotional Allocation Modeling", 7 pages.

Turnbull et al., "Semantic Annotation and Retrieval of Music and Sound Effects", IEEE Transactions on Audio, Speech, and Language Processing, vol. 16, No. 2, Feb. 2008, pp. 467-476.

Turnbull, et al., "Towards Musical Query-by-Semantic-Description using the CAL500 Data Set", ACM SIGIR, Amsterdam, The Netherlands, Jul. 23, 2007, pp. 439-446.

Office action for U.S. Appl. No. 12/116,855, mailed on May 30, 2012, Cai et al., "Music Recommendation using Emotional Allocation Modeling", 7 pages.

Office action for U.S. Appl. No. 13/363,241, mailed on May 24, 2012, Cai et al., "Scalable Music Recommendation by Search", 10 pages.

* cited by examiner

EXEMPLARY USER INTERFACE 200 AND
EXEMPLARY METHOD 210

EXEMPLARY MULTI-MODAL METHOD 510

SCALABLE MUSIC RECOMMENDATION BY SEARCH

BACKGROUND

The growth of music resources on personal devices and Internet radio has altered the channels for music sales and increased the need for music recommendations. For example, store-based and mail-based CD sales are dropping while music portals for electronic distribution of music (bundled or unbundled) like iTunes, MSN Music, and Amazon are increasing.

Another factor influencing aspects of music consumption is the increasing availability of inexpensive memory devices. For example, a typical mp3 player with 30 G hard disk can hold more than 5,000 music pieces. With such a scale for a music collection, a "long tail" distribution may be observed for a user's listening history. That is, in a user's collection, except for a few pieces that are frequently played, most pieces are visited infrequently (e.g., due to a variety of factors including those that make some potentially useful operations of portable devices practically inconvenient). Even on desktop computers, it is usually a tedious task to select a group of favorite pieces from a larger music collection. Therefore, music recommendation is highly desired because users need suggestions to find and organize pieces closer to their taste.

While techniques to generate recommendations can be useful for an individual user consuming her own personal collection, they are also useful for an individual user wanting to add new pieces to her collection. Consequently, commercial vendors are keenly aware of the need to help consumers find more interesting songs. Many commercial systems such as Amazon.com, Last.fm (http://www.last.fm), and Pandora (http://www.pandora.com) have developed particular approaches for music recommendation. For example, Amazon.com and Last.fm adopt collaborative filtering (CF)-based technologies to generate recommendations. For example, if two users have similar preferences for some music songs, then these techniques assume that these two users tend to have similar preferences for other songs (e.g., song that they may not already own or are aware of). In practice, such user preference is discovered through mining user buying histories. Some other companies such as Pandora utilize content-based technologies for music recommendations. This technique recommends songs with similar acoustic characteristics or meta-information (like composer, theme, style, etc.).

To achieve reasonable suggestions, CF-based methods should be based on large-scale rating data and an adequate number of users. However, it is hard to extend CF-based methods to applications like recommendation on personal music collections due to the lack of a community. Moreover, CF-based methods still suffer from problems like data sparsity and poor variety of recommendation results.

Content-based techniques can meet the requirements of more application scenarios, as they simply focus on properties of music. Content-based techniques can be further divided into metadata-based and acoustic-based methods. Metadata, which includes properties such as artists, genre, and track title, are global catalog attributes supplied by music publishers. Based on such attributes, some criteria or constraints can be set up to filter favorite pieces. However, building optimal suggestion sequences based on multiple constraints is an NP-hard problem. Although some acceleration algorithms like simulated annealing have been proposed, it is still difficult to extend such methods to a scale with thousands of pieces and hundreds of constraints. Also based on metadata, some other methods utilized statistical learning to construct recommendation models from existing playlists. Due to the limitation of training data, such learning-based approaches are also difficult to scale up. Furthermore, metadata can be too coarse to describe and distinguish the characteristics of a piece of music. And, in practice, it's also hard to obtain complete and accurate metadata in most situations.

Another approach to music recommendation uses acoustic-based techniques. Such techniques tend to have fewer restrictions than CF and content-based techniques. Further, acoustic-based techniques to music recommendation are suitable for situations where consumers or service providers own the music data themselves. In general, acoustic-based techniques first extract some physical features from audio signals, and then construct distance measurements or statistical models to estimate the similarity of two music objects in the acoustic space. A recommendation can match music pieces with similar acoustic characteristics and group these as suggestion candidates.

As described herein, various exemplary methods, devices, systems, etc., generate music recommendations in a scalable manner based at least in part on acoustic information and optionally other information in a multimodal manner.

SUMMARY

An exemplary method includes providing a music collection of a particular scale, determining a distance parameter for locality sensitive hashing based at least in part on the scale of the music collection and constructing an index for the music collection. Another exemplary method includes providing a song, extracting snippets from the song, analyzing time-varying timbre characteristics of the snippets and constructing one or more queries based on the analyzing. Such exemplary methods may be implemented by a portable device configured to maintain an index, to perform searches based on selected songs or portions of songs and to generate playlists from search results. Other exemplary methods, devices, systems, etc., are also disclosed.

DESCRIPTION OF DRAWINGS

Non-limiting and non-exhaustive examples are described with reference to the following figures.

DETAILED DESCRIPTION

Various exemplary methods, devices, systems, etc., pertain to search-based solutions for scalable music recommendations. As explained below, acoustic features of a song may be analyzed, in part, via a process referred to as signature extraction. For example, a search-based method can include signature extraction for a seed and signature extraction for music in a collection. In such a method, the signature extraction of the seed allows for formation of a query while the signature extraction of the music in the collection allows for formation of an index. In combination, the query relies on the index to provide search results. Such search results may be ranked according to one or more relevance criteria. Further, playlists may be generated from search results, whether ranked or unranked.

While various techniques may be used for index formation, as described herein, an exemplary approach uses a combination of scale-sensitive parameter extraction and locality sensitive hashing (LSH) indexing.

Figure 1:
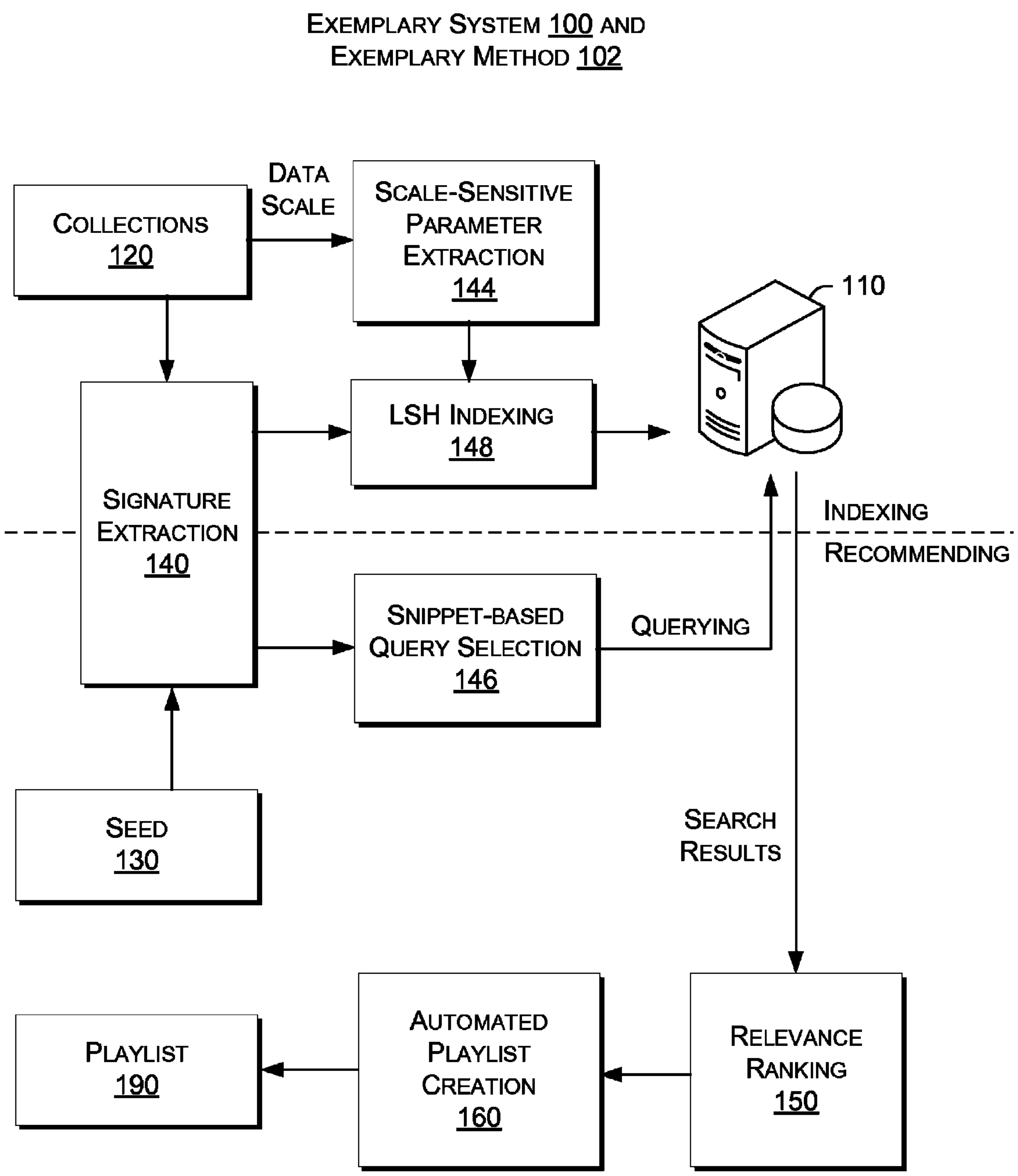
FIG. 1 is a diagram of an exemplary system and an exemplary method for indexing, searching and recommending music.

FIG. 1 shows an exemplary system 100 and method 102 that may be characterized as a search-based solution for scalable music recommendations. In the example of FIG. 1, a computing device 110 receives information and maintains an index for outputting one or more search results responsive to a query.

In general, the method 102 may be divided into two phases, an indexing phase and a recommending phase. While the computing device 110 is shown above the indexing line, it is involved with both of these phases. The device 110 can include one or more processors, memory and logic to perform various aspects of indexing, recommending or indexing and recommending.

In the indexing phase, music in a collection or collections 120 is provided to a signature extraction block 140 and to a scale-sensitive parameter extraction block 144. The extracted signatures from the signature extraction block 140 and the scale-sensitive parameters from the parameter extraction block 144 are provided to a LSH indexing block 148. In turn, the LSH indexing block 148 generates an index, which may be stored in the computing device 110.

In the recommending phase, a seed (a piece of music) 130 is provided to the signature extraction block 140. The extracted signature for the seed 130 is provided to a snippet-based query selection block 146 to form a query. The query may be generated by the computing device 110 or communicated to the computing device 110, which maintains an index. Recommending occurs via a query-based search that uses to the index to produce search results.

In the example of FIG. 1, a relevance ranking block 150 ranks the search results based on one or more relevance criteria. An automated playlist creation block 160 may automatically create and output playlist 190 using the ranked search results or optionally using unranked search results.

As described with respect to FIG. 1, for an exemplary indexing phase, a number of music pieces 120 can be provided where each music piece is transformed to a music signature sequence 140 (e.g., where each signature characterizes timbre). Based on such signatures, a scale-sensitive parameter extraction technique 144 can then be used to index the music pieces for performing a similarity search, for example, using locality sensitive hashing (LSH) 148. Such a scale-sensitive technique can numerically find appropriate parameters for indexing various scales of music collections and guarantee that a proper number of nearest neighbors are found in a search.

As described with respect to FIG. 1, in an exemplary recommendation phase, representative signatures from snippets of a seed piece 130 can be extracted as query terms, to retrieve pieces with similar melodies for suggestions.

As described with respect to FIG. 1, an exemplary relevance-ranking function can sort search results, based on criteria such as matching ratio, temporal order, term weight and matching confidence (e.g., an exemplary ranking function may use all four of these criteria).

As described with respect to FIG. 1, an exemplary approach generates a dynamic playlist that can automatically expand with time.

Various trials are discussed below that demonstrate how the exemplary system 100 and method 102 can, for several music collections at various scales, achieves encouraging results in terms of recommendation satisfaction and system scalability.

In general, acoustic-based techniques first extract some physical features from audio signals, and then construct distance measurements or statistical models to estimate the similarity of two music objects in the acoustic space. In recommendation, music pieces with similar acoustic characteristics are grouped as so-called “suggestion candidates”. Some conventional approaches modeled each music track using a Gaussian mixture model (GMM) and then found candidates by computing pair-wise distances between pieces. Another conventional approach, groups music tracks using Linde-Buzo-Gray algorithm (LBG) quantization based on MPEG-7 audio features where the group closest to the seed piece is returned as suggestion candidates. Yet another conventional approach constructs music clusters using MFCCs and K-means.

From an overview of various conventional recommendation scenarios, it was found that scales of music collection are quite different. For example, a music fan needs help to automatically create an ideal playlist from hundreds of pieces on a portable music player (e.g., flash memory or small disk drive device); while an online music radio provider should do the same job but from several million pieces. In other words, scale of a collection can vary significantly (e.g., from 10 to 10 million) between an ordinary music fan and a commercial music service.

Conventional techniques for music recommendation encounter difficulties when addressing the problem of scalability (e.g., either when scaling down or scaling up). CF-based methods must rely on large-scale user data, and performance will decrease significantly when the data scale drops. Content-based approaches mainly use linear scan to find candidates for suggestions, and processing time will increase linearly with the data scale. To accelerate the processing time on large-scale music collections, most content-based approaches utilize track-level descriptions of pieces, i.e., a whole music piece is characterized with one feature vector or one model. Some approaches further group music pieces into clusters, and a similarity search is carried out on the cluster-level. In a review of techniques, the best performance reported in one state-of-the-art work was tenths of a second for one match over a million pieces. Although the processing speed is improved, such high-level descriptions may not be able to provide enough information to characterize and distinguish various pieces. On the one hand, music is a time sequence and the temporal characteristics should be taken into account when estimating the content similarity. On the other, some high-level descriptions are too coarse and are incapable of filtering an ideal suggestion from many similar candidates. Furthermore, another disadvantage of current approaches is that they are bound to given music collections, and are basically grounded on pre-computed pair-wise similarities. Therefore, update costs are considerable. While in real situations, the members of a music collection usually change frequently, especially in personal collections.

As described herein, various exemplary techniques focus on acoustic-based music recommendation, noting that such techniques may be extended or complimented by multi-modality techniques (e.g., CF-, meta-, etc.). An exemplary scalable scheme can meet recommendation requirements on various scales of music collections. Such a scheme converts a recommendation problem to a scalable search problem, or, in brief, recommendation-by-search. A search scheme for recommendation of music in a scalable manner may be explained, in part, by considering that a Web search is a kind of recommendation process. That is, users submit requests (queries) and the recommender (search engines) returns suggestions (web pages). Analogously, for purposes of describing various exemplary techniques, a musical piece can be regarded as a webpage, and can be indexed based on its local melody segments (just like a webpage is indexed based on keywords) for efficient retrieval.

As described herein, compared with conventional techniques, recommendation-by-search has the following advantages. First, search technologies have been proven efficient. Second, some search technologies can be scaled from a local desktop, to an intranet, to the entire Web. Third, as users select and organize queries (e.g., consider a query-by-humming (QBH) scenario where users decide which part of a piece to hum as a query), user interaction can be integrated into search-based recommendation. Moreover, updating is more convenient and cheaper by means of a search-based approach. For example, one can incrementally update an index without needing to go through the whole music collection to re-estimate pair-wise similarities. For the purpose of scalable music recommendation, as described herein, various exemplary techniques address one or more of the following:

Configuration of an index structure based on data scale, for example, under different datascales, the criterion of "similarity" between music segments aims to be adaptively changed to guarantee a proper number of candidates retrieved as suggestion candidates.

Preparation of one or more seeds to form a query or queries for a recommendation-by-search process, for example, as mentioned, it may be impractical or inefficient to use an entire musical piece as a seed as, often, only certain parts of a piece impresses a user.

Provided a list of retrieval results, a ranking strategy to rank these results, for example, based on similarities to a seed. Such a ranking strategy aims to find the most appropriate music for recommendation, which can be a dynamic ranking of resulting music pieces.

Figure 2:
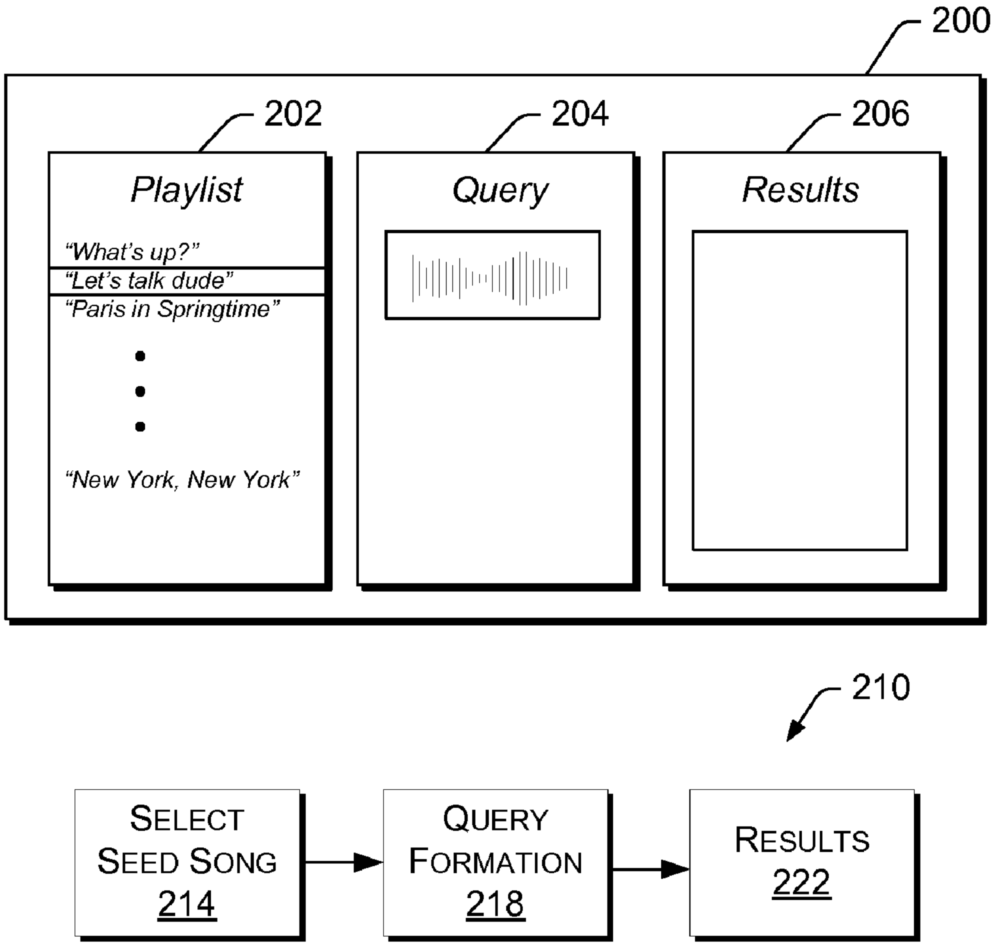
FIG. 2 is a diagram of an exemplary user interface and an exemplary method for selecting a song, forming a query and presenting search results.

FIG. 2 shows an exemplary user interface 200 and an exemplary method 210 for search-based recommendation of music. The user interface 200 includes a playlist pane 202 that lists songs. A query pane 204 allows for a user to drag or otherwise select (or send) a song for use as a query. For example, a user may select a currently playing piece or another piece in the playlist for use as a query. The query pan 204 may display certain information about the selected piece, for example, a snippet as a waveform, which may be played and optionally confirmed as being a desirable portion of the selected song. A results pane 206 provides for presentation of results to a user. Results in the results pane 206 may be ranked or randomly presented. The user interface 200 may allow for a user to select at least some of the results to form a playlist (e.g., to amend an existing playlist or to form a new playlist).

The exemplary method 210 includes a selection block 214 that allows for selection of a song via receipt of a command or commands (e.g., received at least in part via the user interface 200), a query formation block 218 that forms a query based on a selected song and a results block 222 that returns results based at least in part on the formed query (e.g., for presentation via the user interface 200).

With respect to the method 210, such a method may rely on an exemplary search-based system for scalable music recommendation that includes a computing device that maintains an index structure (e.g., based on a datascale), a process for seed selection/preparation and optionally a process for ranking results.

In a particular example, an exemplary method represents a musical piece with a music signature sequence in which the signature characterizes one local music segment. Next, a local sensitive hashing (LSH) technique is applied to index signatures to consider their $L_2$ distances. As described herein, an exemplary algorithm can adaptively estimate appropriate parameters for LSH indexing on a given scale of a music collection. For a recommendation process, representative signatures are extracted as query terms from a provided seed piece using, for example, a music snippet analysis. For relevance ranking, an exemplary function can integrate criteria such as matching ratio, temporal order, term weight, and matching confidence.

As mentioned with respect to FIGS. 1 and 2, an exemplary method can dynamically generate a playlist based on search results. For example, an exemplary method can generate a playlist based on search results in a manner where requirements of "stick to the seed" and "drift for surprise" are balanced.

Various trials on various collections, from around 1,000 pieces to more than 100,000 pieces, show that exemplary approaches can achieve recommendation satisfaction and system scalability, with relatively low CPU and memory costs.

In the description that follows, an overview of a particular approach is presented along with an example for implementation of scale-sensitive music indexing; then, a process for recommendation-by-search and a process for automatic construction of a playlist are presented. Details from trials are also presented.

As mentioned with respect to FIG. 1, an exemplary method includes a scale-sensitive music indexing stage and a recommendation-by-search stage. In the indexing stage, sequence of signatures is extracted for each piece in a music collection. For example, this stage may proceed in a manner akin to term extraction for text document indexing. In the example of FIG. 1, a signature can be a compact representation of a short-time music segment based on low-level spectrum features. With a signature sequence, the local spectral characteristics and their temporal variation over a music piece can be preserved so as to provide more information than track-level descriptions.

Once processed, signatures can be organized by inverted indexes based on hash codes, for example, generated by LSH. LSH theoretically guarantees signatures that are close to one another will fall into the same hash-bucket with high probability. However, a key problem remains as to how to define a criterion for "closeness" in LSH (which will directly affect system performance). In the example of FIG. 1, an algorithm can automatically estimate a "closeness" boundary based on the scale of a music collection, which, in turn, helps to ensure a proper number of results can be retrieved for recommendation. For example, the boundary of such "closeness" in indexing can be adjusted to be somewhat relaxed for a small music collection and tightened for a massive collection.

In a recommendation stage, a seed piece can be converted to a signature sequence, for example, based on which snippets of the piece are extracted. Snippets (or thumbnails) may be categorized as representative segments in a music piece. For example, a snippet may be the main chorus or a highlight characteristic of a music piece (e.g., a rhythmic rift segment, a saxophone solo, etc.). Hence, signatures can be selected from one or more snippets of a piece, instead of directly from the piece as a whole, and the signatures can be used to construct queries for retrieval. Returned search results can then be sorted through a relevance-ranking function. In an exemplary ranking function, besides using some sophisticated criteria (e.g., as may be used in a text search), several new types of criteria can be introduced to meet the specialties of music search. A playlist may be constructed dynamically using the ranked search results.

In a trial example, a system is implemented by building an efficient disk-based indexing storage where only a small cache is dynamically kept in memory to speed up the search process. In such a manner, this trial system can operate on most off-the-shelf PCs.

Scale-Sensitive Music Indexing

As described herein, scale-sensitive music indexing is typically an off-line process, particularly for large collections. An exemplary indexing scheme relies on music signature generation, which is sometimes referred to as music signature extraction. Some conventional approaches refer to "fingerprinting", however, the fingerprints defined by these approaches tend to be quite different from each other. For example, some are based on the distortion between two adjacent 10 ms audio frames and some are based on the statistics of a whole audio stream. As described herein, an exemplary approach is somehate similar to a two-layer oriented principal component analysis (OPCA) as it is based on a length suitable for a specified requirement and as it is robust enough to overcome noise and distortions caused by music encoding.

In a particular example, all music files of a collection are converted to 8 kHz, 16-bit, and mono-channel format, and are divided into frames of 25.6 ms with 50% overlapping. For each frame, 1024 modulated complex lapped transform (MCLT) coefficients are first computed and are then transformed to a 64-dimensional vector through the first-level OPCA. Further, to characterize the temporal variation, such 64 dimensional vectors from 32 adjacent frames (around 4.2 seconds) are concatenated and again transformed to a new 32 dimensional vector through the second-level OPCA. In this example, the MCLT coefficients are used to describe the timbre characteristics on spectrum for each frame; and the time window is experimentally selected as 4.2 seconds to characterize the trend of temporal evolution. In this manner, both spectral and temporal information of the corresponding audio segment is embedded in the last 32-dimensional vector, which is taken as a signature. Thus, through this exemplary approach, a piece is converted to a sequence of signatures by repeating the above operation through the whole audio stream.

A primary objective of music indexing is to build an efficient data structure to accelerate similarity search. It is worth noticing that the music indexing in this work tends to be quite different to those introduced in audio fingerprinting related works. In fingerprinting systems, the key difference is that only identical fingerprints are allowed to be indexed together, and two fingerprints with only small differences may have quite different index references. As described herein, similarity search is used that tries to group those close signatures in the indexing. As discussed below, control the tolerance of such "closeness" can ensure a proper number of signatures can be indexed together in the same hash bucket.

Locality sensitive hashing (LSH) was proposed, and extended, as an efficient approach to solve the problem of high-dimensional nearest neighbor search. LSH is based on a family of hash functions $H=\{h:S\rightarrow U\}$, which is called locality sensitive for the distance function $D(\cdot,\cdot)$, if and only if for any $p,q \in S$, it satisfies:

$$Pr_H(h(p)=h(q))=f_D(D(p,q)) \quad (1)$$

where $f_D(D(p, q))$ is monotonically decreasing with D(p,q). Given a(R, λ, γ)-high dimensional nearest neighbor search problem, LSH uniformly and independently selects L×K hash functions from H, and hashes each point into L separate buckets. Thus, two closer points will have higher collision probabilities in the L buckets. It has been theoretically proven that given a certain (R, λ, γ), the optimal L and K can be automatically estimated. In the nearest neighbor search problem, the probabilities λ and γ can be experientially selected, and the last problem is how to select a proper R.

According to an exemplary approach that relies on LSH, for any given query point q, each point p satisfying $D(p, q)\leqq R$ should be retrieved with probability at least λ, and each point satisfying $D(p, q)>R$ should be retrieved with probability at most γ. The value of R directly affects the expectation of how many neighbors can be retrieved with probability λ using LSH. As described herein, the value of R can be determined at least in part on scale of a music collection. For example, for given a scale of 1,000 pieces, R may be estimated (e.g., see below for numerical technique to estimate R).

Figure 3:
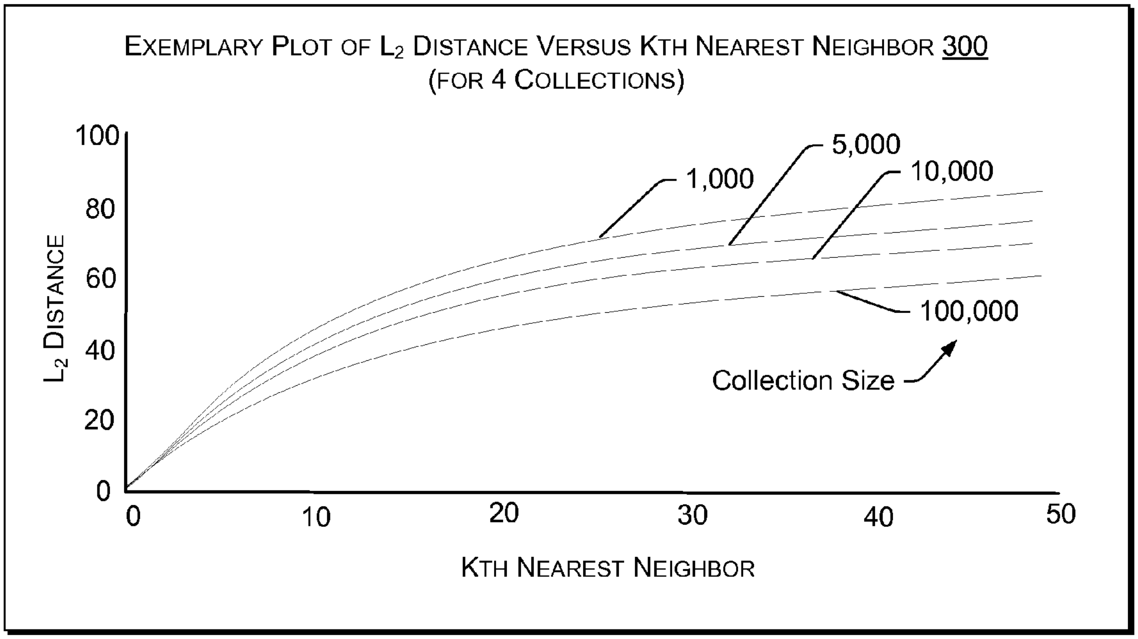
FIG. 3 is an plot of $L_2$ distance versus Kth nearest neighbor for four music collections that differ in scale.

FIG. 3 shows a plot 300 as an example that included random sampling of 1000 signatures as query terms from four music collections with different scales (1,000; 5,000; 10,000; and 100,000), respectively, and then computing the average $L_2$ distance of a term to its Kth neighbor for each collection. From the plot 300 of FIG. 3, to return a given number of neighbors, different boundaries can be set for different data scale. As described herein, such a boundary can be relaxed for a small set while tightened when data scale increases, to ensure that an expected number of neighbors can be returned. Specifically, it can be a requirement of recommendation-by-search to promise a proper number of pieces will be returned for suggestion on whatever scale of music collections.

With respect to scale sensitive parameter estimation, an exemplary numerical technique can automatically estimate the value of R for a given scale of music collection. An assumption here is, whatever the data scale is, the distribution of the pair-wise $L_2$ distances among signatures should be relatively stable. To verify such an assumption, trials included checking the pair-wise distances on four collections, and list the corresponding mean μ and standard deviation a in Table 1.

TABLE 1

Mean and Standard Deviation of Pair-wise Distances of Signatures

| | Scale~ | | | |
|---|---|---|---|---|
| | 1,000 | 5,000 | 10,000 | 100,000 |
| μ | 177.1 | 176.3 | 175.8 | 175.6 |
| σ | 39.3 | 39.3 | 39.2 | 39.2 |

From Table 1, the means and standard deviations of the pair-wise distances are close on various scales of the collections. For a histogram of the distance distribution on the collection that contains more than 100,000 pieces, the distribution is similar to a Gaussian distribution. However, it is asymmetric since the $L_2$ distance is always larger or equal to zero, and it can be better approximated by a Gamma distribution. The probability density function (pdf) of a Gamma distribution is:

$$g(t;\alpha,\theta)=t^{\alpha-1}[e^{-t/\theta}/\Gamma(\alpha)\theta^{\alpha}] \quad (2)$$

where the two parameters α and θ can be estimated as:

$$\alpha=\mu^2/\sigma^2;\ \theta=\sigma^2/\mu \quad (3)$$

Based on the above assumption, it is possible to consider that for various music collections, the pair-wise $L_2$ distances of the signatures of the collections follow a same Gamma distribution g(t;α,θ). Thus, given the data scale $V_0$ and the expected result number V, the optimal value of R can be obtained by solving the following equation (Eqn. 4), where R is replaced by x for clarity:

$$f(x)=\int_0^x g(t;\alpha,\theta)\,dt-\rho = \int_0^x t^{\alpha-1}\frac{e^{-t/\theta}}{\Gamma(\alpha)\theta^\alpha}\,dt-\rho$$

and $\rho=V/V_0$ is the expected ratio of the returned results. In the trials experiments, V is set to 20 for all the datasets. By letting s=t/θ, equation (4) is further transformed to the following equation (Eqn. 5):

$$f(x)=\frac{1}{\Gamma(\alpha)}\int_0^{x/\theta} s^{\alpha-1}e^{-s}\,ds-\rho = \frac{1}{\Gamma(\alpha)}\gamma\left(\alpha,\frac{x}{\theta}\right)-\rho$$

where γ(α,x) is a lower incomplete Gamma function, and can be solved numerically. Thus, x can be iteratively achieved using the Newton-Raphson method with a random initial value $x_0$, as:

$$x_{n+1}=x_n-f(x_n)/f'(x_n) \quad (6)$$

where the derivative f'(x)=g(t; α, θ).

In such a manner, it is possible to estimate a proper R and construct a LSH-based index, according to the scale of a given music collection. In the search stage, a query signature can be hashed by the same set of LSH hash functions, and its neighbors can be independently retrieved from the corresponding L buckets.

Recommendation-by-Search

Music in a similar style usually adopts some typical rhythm patterns and instruments. For example, fast drumbeat patterns are widely used in most heavy metal music. Similar instruments usually generate similar spectral timbres, and similar rhythms will lead to similar temporal variation. As music signature describes temporal spectral characteristics of a local audio clip, it is expected that music pieces of a similar style will share some similar signatures, as documents on similar topics usually share similar keywords. Thus, as described herein, music recommendation can be made practical by retrieving pieces with similar signatures. In other words, in an exemplary system, the criterion for recommendation can be set to find music pieces with similar time-varying timbre characteristics.

Selection of proper signatures as query terms from a piece is not a trivial problem. First, not all the signatures in a piece are representative to its content. Second, too many query terms will drop the search performance significantly (on average, a piece around 5 minutes can have more than 2,000 signatures). Studies demonstrate that many people like and remember a piece mostly because some short but impressive melody clips that recur in the piece. Therefore, an exemplary approach can select query terms from such typical and repetitive segments, which have been called music snippets or thumbnails. More specifically, an exemplary approach may select query terms only from such typical and repetitive segments.

As described herein, an algorithm based on audio signatures is implemented for various trials. In this implementation, three snippets from the front, middle, and back parts of a piece are extracted where each snippet is a segment of around 10 to 15 seconds.

There are usually several repetitive segments for a piece, and the snippet detection algorithm can also return multiple candidates. To cover more reasonable snippets, an approach can select three most possible candidates from different parts of a piece.

However, in the trial implementation, the "long query" problem can be raised as there are still about 100 signatures in a 15 second segment, which can burden a search engine.

Considering that music is a continuous stream and the two adjacent signatures have around 4 second overlaps, the $L_2$ distances between adjacent signatures are usually small, unless some distinct changes happen in the signal. Thus, such signatures can be further compacted by grouping signatures close enough to each for reducing the number of query terms.

In an exemplary implementation, a system performs bottom-up hierarchical clustering on signatures from one snippet where the clustering is stopped when the maximum distance between clusters is larger than R/2. For each cluster, the signature closest to the center can be reserved as a query term. In trials, the query terms could be reduced to 1/10 after the clustering. In turn, by combining adjacent signatures in a same cluster, a music snippet is converted to a query, which is represented with a sequence of (term, duration) pairs, as:

$$Q\sim[(q_1^Q,t_1^Q),\ldots,(q_i^Q,t_i^Q),\ldots,(q_{N_Q}^Q,t_{N_Q}^Q)],\ q_i^Q\in S_Q \quad (7)$$

where $q_i^Q$ and $t_i^Q$ are the signature and the duration of the ith term, $S_Q=\{s_1, s_2, s_{NUQ}\}$ is the set of all the $N_{UQ}$ unique terms in the query, and $N_Q$ is the query length.

Relevance ranking is a component of almost all search related problems. In text search, relevance ranking has been well studied and a common algorithm is the BM25 algorithm. While some aspects of relevance ranking in music search have analogous aspects in text search, music search has particular characteristics not found in text search. For example, as shown in Eqn. 7, query terms can have duration information and their temporal order may be important. Moreover, as a music search is similarity-based as opposed to identical matching, confidence of such a matching can also be considered in ranking.

Referring back to the search process and how the search results are obtained and organized for ranking, a query term (e.g., a signature) is hashed into L buckets with LSH, and the pieces indexed in these L buckets is merged as a result list for the query term. For a hit point (also a signature in a piece in the index), its similarity to the query term can be approximated by the number of buckets it belongs to over the whole L buckets (according to the LSH theory, the closer two signatures are, the higher probability they are in a common bucket). Such a similarity can be considered as a confidence of this matching. After going through all the unique terms in the query, their result lists can be further combined to a candidate set for relevance ranking. In such an example, it can be assumed that the search operation is "OR", as it cannot be expected that all the terms in a query will exist in another piece.

Figure 4:
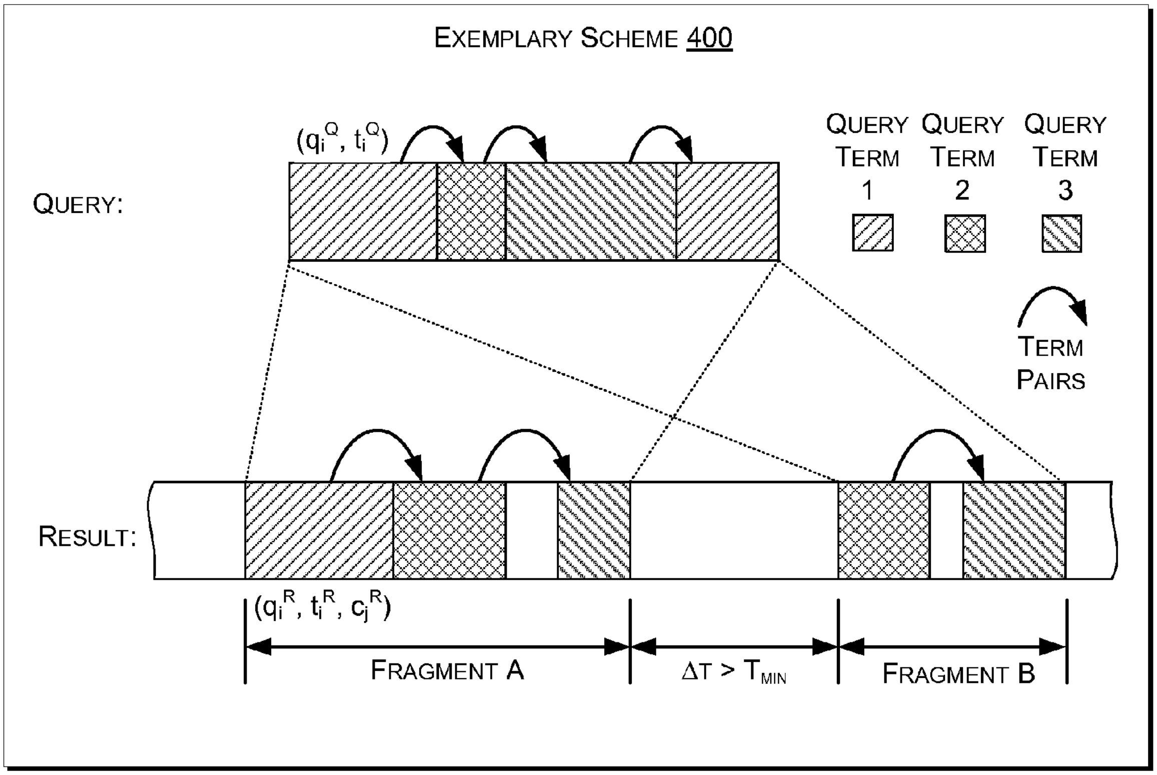
FIG. 4 is a diagram of an exemplary scheme for forming a query with multiple query terms and a corresponding search result.

FIG. 4 shows an exemplary scheme 400, where for each candidate piece in the set, its matching statistics can be represented with a triple sequence by merging adjacent hit points of a same term into a segment. A triple is in the form of $(q^R, t^R, c^R)$, where $q^R$ is the matched term, $t^R$ is the segment duration, and $c^R$ is the average matching confidence of the hit points in this segment. Hence, as shown in FIG. 4, an exemplary scheme includes representing statistics for a candidate music piece in a set by at least one of the following a matched term, a duration and a confidence. Specifically, the example of FIG. 4 shows use of all three types of matching statistics in the form of a triple.

Also shown in the scheme 400 of FIG. 4, for ranking, each candidate piece can be further divided into fragments, for example, if the time interval $\Delta t$ between two matching segments is larger than a pre-defined threshold $T_{min}$ (which was set to 15 seconds for various trials). The scheme 400 may further include computing the relevance scores for all the fragments and returning the maximum as the score of the candidate piece.

Considering characteristics of such an exemplary music search, the relevance of a fragment is mainly based on the matching ratio and temporal order while also integrating the term weight and the matching confidence, as explained above.

For weights, an approach akin to the Robertson/Sparck weight in text retrieval, defines the weight of the ith term in $S_Q$ according to the following equation (Eqn. 8):

$$w_i = \log\frac{V_0 - n_i + 0.5}{n_i + 0.5}$$

where $V_0$ is the total number of pieces in the dataset (i.e., the data scale defined above) and $n_i$ is the length of the result list of the ith term. The sum of all the term weights in $S_Q$ is further normalized to one. In such a manner, lower weights are assigned to popular terms while higher weights to special terms (e.g., consider the inverse document frequency (idf) utilized in text retrieval).

An exemplary ranking function can be defined as a linear combination of the measurements of the matching ratio $f_{ratio}$ and the temporal order $f_{order}$, as:

$$f_{ranking} = f_{ratio} + f_{order} \tag{9}$$

To describe in a detailed implementation, consider the following:

$f_{ratio}$ defined as the following equation (Eqn. 10):

$$f_{ratio} = \frac{1}{N_{UQ}} \sum_{i=1}^{N_{UQ}} \frac{\min(d_i^Q, d_i^R)}{\max(d_i^Q, d_i^R)} \cdot w_i$$

where $d_i^Q$ and $d_i^R$ are the durations of the ith term occurring in the query and in the fragment, respectively:

$$d_i^Q = \sum_{k|q_k^Q = s_i} t_k^Q;$$

$$d_i^R = \sum_{k|q_k^R = s_i} t_k^R$$

In Eqn. 10, the matching ratio is combined with the term weight.

$f_{order}$ defined as the following equation (Eqn. 12):

$$f_{order} = \frac{1}{N_Q - 1} \sum_{i=1}^{N_Q - 1} P_{occur}(q_i^Q, q_{i+1}^Q)$$

where $P_{occur}(q_i^Q, q_{i+1}^Q)$ is the maximum confidence of the pair $(q_i^Q, q_{i+1}^Q)$ occurring as in order of the result fragment, as the following equation (Eqn. 13):

$$P_{occur}(q_i^Q, q_{i+1}^Q) = \max_{j|q_j^R = q_i^Q \& q_{j+1}^R = q_{i+1}^Q} (c_j^R \cdot c_{j+1}^R)$$

In Eqn. 13, the temporal order and matching confidence are combined together.

In the foregoing scheme, fragments with larger matching ratio and more ordered term pairs are ranked with higher relevance scores, based on which corresponding candidate pieces are sorted for further recommendation.

Automated Playlist Creation

While a search-based approach can find recommendations for a given piece from a music collection, often, users desire a continuous playlist, which may even automatically expand with time. As described herein, an exemplary scheme for automated playlist creation relies on results from a recommendation-by-search process.

An exemplary playlist generation process aims to provide an optimum compromise between the desire for repetition and the desire for surprise. For example, a good recommender may be configured to suggest both popular pieces with similar attributes ("stick to the seed") and new pieces to provide fresh feeling ("drift for surprise"). However, for most content-based recommendation systems, finding novel songs becomes an unavoidable problem as their criterion is to find similar pieces (noting that for CF-based recommendation, this issue may be addressed using a social community). As described herein, an exemplary approach can find new songs to fulfill "drift for surprise" of a listener. To improve diversity of recommendation, an exemplary approach heuristically can add some dynamics when creating playlists.

An exemplary generation process can include: assigning a piece as a seed, extracting snippets from the seed to form queries, searching using the queries, adding one or more recommended pieces (i.e., search results) to a playlist, randomly selecting a recommended piece and assigning the new piece as a seed. The new seed can then be used to repeat the extracting, adding, etc. In such a manner, where a new seed differs from the original seed, drift is introduced (e.g., "drift for surprise). The timing of the drift cycle may be determined based on any of a variety of factors. For example, drift cycle time may be set based in part on playlist size, song length, user input, etc.

In a particular example, an exemplary method includes manually assigning a piece as a seed and extracting three snippets from the seed piece to construct three queries for performing three searches. In this example, the first result of each query can be added to the playlist. These three search result pieces are noted as being acoustically similar to the seed piece, which helps to satisfy a requirement for "stick to the seed".

With respect to "drift for surprise", this particular example may randomly select a piece from the top three suggestions (or the three searches) as a new seed and then repeat snippet extraction. Such an approach, where the new seed differs from a previous seed, can drive a playlist to a somewhat new style and thereby meet the requirement of "drift for surprise".

As described herein, user interactions can be integrated into a playlist generation process. For example, a user may tag any particular part or parts of a piece he is interested in and the playlist can, in turn, be dynamically updated using queries generated from the tagged part or parts. Such a process may operate as an alternative to snippet extraction; noting that snippet extraction may be a default process.

Trial Results

An exemplary recommendation-by-search system was used to perform various trials. An analysis of the trials assessed system efficiency. Quantitative evaluations, on both acoustic and genre consistencies, and subjective evaluations from a user study demonstrate that the system is effective and efficient on various scales of music collections and that the recommendation quality is also acceptable, performing closely to some state-of-the-art commercial systems.

For the trials, 114,239 pieces (from 11,716 albums) were collected in mp3 and wma formats. To simulate music collections with different scales, random sampling was performed for some albums (from all the 11,716 albums) to construct four collections: C1 (1,083 pieces in 106 albums); C2 (5,126 pieces in 521 albums); C3 (9,931 pieces in 1007 albums); and C4 (all the pieces). These collection scales were selected to simulate the scenarios of recommendation on portable devices, personal PCs and online radio services.

To evaluate the performance of the system on various scales of collections, for each collection, 20 playlists were created with the seed pieces listed in Table 2.

TABLE 2

Information about seed pieces for trials.

| No. | Track | Artist | Genre |
|---|---|---|---|
| 1 | Lemon Tree | Fool's Garden | Pop |
| 2 | My Heart Will Go On | Celine Dion | Pop |
| 3 | Candle in the Wind | Elton John | Pop |
| 4 | Soledad | Westlife | Pop |
| 5 | Say You, Say Me | Lionel Richie | Pop |
| 6 | Everytime | Britney Spears | Pop |
| 7 | As Long As You Love Me | Backstreet Boys | Pop |
| 8 | Right Here Waiting | Richard Marx | Rock |
| 9 | Yesterday Once More | Carpenters | Rock |
| 10 | It's My Life | Bon Jovi | Rock |
| 11 | Tears in Heaven | Eric Clapton | Rock |
| 12 | Take Me to Your Heart | Michael Learns to Rock | Rock |
| 13 | What'd I Say | Ray Charles | R&B |
| 14 | Beat It | Michael Jackson | R&B |
| 15 | Fight For Your Right | Beastie Boys | Rap |
| 16 | Does Fort Worth Ever Cross your Mind | George Strait | Country |
| 17 | Cross Road Blues | Robert Johnson | Blues |
| 18 | Born Slippy | Underworld | Electronic |
| 19 | Scarborough Fair | Sarah Brightman | Classical |
| 20 | So What | Miles Davis | Jazz |

For comparison, the recommendation lists from a state-of-the-art online music recommendation service, Pandora, were recorded using the same 20 seeds. In addition, the trials generated 20 playlists in shuffle model by randomly selecting pieces from the collections. The length of all the playlists was fixed to 10. Thus, in the trials, 6 playlist collections were constructed with 20 playlists in each playlist collection.

Although there are some related techniques in the literature for automated and acoustic-based music recommendation, it is still not straightforward to compare the exemplary trial system to those as implementation details and parameter settings are typically unavailable. In the trials, an attempt was made to situate the recommendation quality of the trial system using two relatively fair references-random shuffle and Pandora. Pandora is public for access, and it is a well-known commercial recommendation service.

As noted, the trial system relies on acoustic information, as a single mode. Such an exemplary system may be extended to multimode. Given the single acoustic only mode nature of the trial system, this automated system was not expected to exceed the performance of Pandora, as Pandora leverages metadata and acoustic-related information, as well as many expert annotations. Thus, Pandora acts as a referee in the following evaluations.

In the trials, a PC with 3.2 GHz Intel Pentium 4 CPU and 1 GB memory was employed to evaluate the system efficiency. First, the performance of the front-end (i.e., audio processing and music signature extraction) was evaluated. To perform this evaluation, 100 pieces were randomly selected in either mp3 or WMA format from the dataset where the average duration was about 5.2 minutes per piece.

In a performance trial, it took 3 minutes and 51 seconds for the front-end (including the steps of mp3/WMA decoding, down-sampling, MCLT, OPCA, and LSH-hashing) to parse all 100 pieces. If the snippet extraction is also included, the total time cost is 5 minutes and 57 seconds. That is, 3.57 seconds are required on average to process a seed piece in recommendation. However, in most applications the seed piece is also a member of the music collection, and the snippets and query terms can be pre-generated and stored. The indexing time of the largest collection C4 is about 87 hours; the detailed index size of each collection is listed in Table 3.

TABLE 3

The usages of disk, memory, and CPU on C1~C4.

| Measure | C1 | C2 | C3 | C4 |
|---|---|---|---|---|
| Index on Disk | 70M | 414M | 787M | 9.16G |
| Runtime Memory in Search | 42.5M | 43.3M | 43.5M | 47.1M |
| Average Search Time | 0.27 s | 1.41 s | 1.72 s | 2.53 s |
| Average Result Number | 491 | 632 | 758 | 985 |

To evaluate the online search performance, for each collection, 1,000 queries (with around 13.4 terms each) were performed. The average performances are shown in Table 3. From Table 3, it is first observed that the memory costs of the trial system on various collections are relatively stable, and such memory cost is also acceptable for most desktop applications on PCs. Second, the average search time increases with the data scale, but is also acceptable for most applications. The search time here includes retrieving inverted indexes from (#term×L) hash buckets, merging, and ranking the search results. In C1, as most of the index can be cached in memory, the speed is quite fast. When index increases with the data scale, the search time becomes longer, as more disk I/O are needed for cache exchange. For a data scale that is extremely large, the search operation can be optionally distributed to multiple machines to accelerate the process time.

Another statistic shown in Table 3 is the average number of returned results. As discussed, it can be desirable to assure enough results are returned for recommendation on various scales of collections. From Table 3, the resulting number can be roughly kept in the range of about 500 to about 1000. In more detail, there are around 45% of pieces in C1 returned for each query; while for C4 the percentage is only around 0.9%. However, the number of results is still increased with the data scale, as the LSH is designed to bind the worst conditions, while in real data the hitting probability is much higher than expected.

In general, the trials for an exemplary system indicate that such scale-sensitive music indexing is effective in practice. In various music scales (application scenarios), such a system can guarantee a return of a proper number of suggestions within an acceptable response time.

As mentioned, there is still not a sophisticated method to give a quantitative evaluation to music recommendation. As described herein, a scheme utilized some indirect evidence for quantitative comparisons. One type of measure is acoustic consistency, to verify the suggestions from the acoustic-level. Another is genre consistency, to verify the suggestions from the metadata-level.

The acoustic consistency can be used to verify how close suggested pieces are in the low-level acoustic space. A GMM-based approach was adopted to measure the distance between two pieces. In implementation, each piece in a playlist is modeled with a GMM in the d=64 dimensional MCLT spectrum space (e.g., as in signature extraction), as the following equation (Eqn. 14):

$$f(x) = \sum_{i=1}^{k} \alpha_i \mathcal{N}\left(x; \mu_i, \sum_i\right) = \sum_{i=1}^{k} \alpha_i f_i(x)$$

where $\mu_i$, $\Sigma_i$, and $\alpha_i$ are the mean, covariance, and weight of the ith Gaussian component $f_i(x)$, respectively; and k is the number of mixtures (which was set as 10 experimentally). The distance between two GMMs f(x) and g(x)is then defined by the following equation (Eqn. 15):

$$d(f, g) = \frac{1}{2}\left(\vec{d}(f, g) + \vec{d}(g, f)\right)$$

where terms include the direct distance from f to g, as the following equation (Eqn. 16):

$$\vec{d}(f, g) = \sum_{i=1}^{k} \alpha_i \min_{j,1 \le j \le k} KL(f_i \mid g_i)$$

Here, the Kullback-Leibler (KL) divergence between two Gaussian components is defined as the following equation (Eqn. 17):

$$KL\left(\mathcal{N}\left(x; \mu_1, \sum_1\right) \middle\| \mathcal{N}\left(x; \mu_2, \sum_2\right)\right) = \frac{1}{2}\left[\log\frac{|\sum_2|}{|\sum_1|} + tr\left(\sum_2^{-1}\sum_1\right) + (\mu_1 - \mu_2)^T \sum_2^{-1} (\mu_1 - \mu_2) - d\right]$$

In this manner, for each playlist, all the pair-wise distances between pieces were computed. After going through all the 20 playlists in a collection, the distribution of such GMM-based distances on the collection was obtained and could be approximated by a Gamma distribution.

From an analysis of the approximate distance distributions on all six playlist collections in the trials, it was found that the average pair-wise distance in shuffle is the largest, while C4 is the smallest. This indicates that pieces suggested by an exemplary search-based approach still have similar acoustic characteristics in the track-level, although only signatures in snippet parts are used for search. This indicates that an exemplary recommendation-by-search approach can satisfy the assumption of acoustic-based music recommendation. With the decrease of the data scale (e.g., from C4 to C1), the average distance became larger, as well as the deviation of the distribution. The distribution of Pandora was in the middle of the shuffled approach and those generated using the exemplary trial system approach. This indicates acoustic features may also be considered in Pandora, but their recommendations are not only based on the acoustic attributes. This observation is consistent with the online introduction of Pandora, that is, it also leverages expert annotations such as culture and emotion to generate their playlists. Thus, in Pandora, pieces with similar annotations are also possibly selected for recommendation, although their low-level acoustic features may be quite different.

A music genre is a category of pieces of music that share a certain style, and is one of the basic tags in music industry. Although the genre classifications are sometimes arbitrary and controversial, it is still possible to note similarities between musical pieces, and thus is widely used in metadata based music recommendation. To guarantee the genres used in the experiment are as accurate as possible, a facility known as All Music (www.allmusic.com), which some consider the most authoritative commercial music directory, was used to manually verify the genre of each piece. In total, nine basic genre categories: Pop, Rock, R&B, Rap, Country, Blues, Electronic, Classical, and Jazz, were adopted for classification.

The evaluation of genre consistency here uses a Shannon entropy approach to measure the genre distribution of pieces in a playlist. The Shannon entropy is defined as the following equation (Eqn. 18):

$$H(x) = -\sum_x p(x)\log_{10} p(x)$$

where p(x) is the percentage of a given genre in a playlist. Here, considering the length of a playlist was 10, log 10 (·) was adopted in Eqn. 18; thus, the entropy of the worst case (the 10 pieces in a playlist are from 10 different genres) is 1. And for the ideal case (all 10 pieces are from a same genre), the entropy is 0. The statistics of the entropies on the 6 collections are listed in Table 4.

TABLE 4

Entropy of the genre distribution on the six playlist collections.

| | Pandora | Shuffle | C1 | C2 | C3 | C4 |
|---|---|---|---|---|---|---|
| Mean | 0.23 | 0.56 | 0.32 | 0.40 | 0.38 | 0.35 |
| Std | 0.15 | 0.08 | 0.13 | 0.17 | 0.15 | 0.16 |

There is not an authoritative criterion to describe what the genre distribution should be like for an ideal playlist. Here, by comparing the average entropies of playlists from Pandora and in a shuffle model, it is assumed that the lower the entropy, the better the playlist quality. In Table 4, the entropy of playlists in shuffle was the highest and with small deviation, and it indeed should be close to the genre distribution of the whole music collection. The genre entropies of the playlists from C1 to C4 are around 0.3~0.4, and are between Pandora and the shuffle one. As genre is actually one of the criteria utilized for recommendation in Pandora, the distribution on Pandora is the most concentrated. Through the comparison, it indicates that that the exemplary trial approach can still keep the genre consistency, to a certain extent.

To evaluate the performance in practice, a small user study was conducted using 10 invited college students as testers. Considering the work load, 5 playlists from each collection were randomly selected for each tester. Thus, each tester evaluated 30 playlists through listening to them one by one; noting that the collection information was blind to the testers. The testers were asked to assign a rating ranging score from 1 to 5 to each playlist. The rating criteria were: 1 ("totally unacceptable"); 2 ("marginally acceptable, but still inconsistent"); 3 ("acceptable, and basically consistent"); 4 ("acceptable, with some good suggestions"); and 5 ("almost all good suggestions"). In this evaluation, "acceptable" was defined as "it is OK to finish the playlist without interruption".

To remove the individual bias, ratings from each tester were first re-normalized before analysis. Then, the normalized ratings from various testers were averaged on each playlist collection and the corresponding mean and standard deviation were kept for comparison, as shown in Table 5.

TABLE 5

Statistics of the subjective ratings for the six playlist collections.

| | Pandora | Shuffle | C1 | C2 | C3 | C4 |
|---|---|---|---|---|---|---|
| Mean | 4.29 | 1.73 | 3.81 | 3.85 | 3.88 | 3.87 |
| Std | 0.69 | 0.52 | 0.91 | 0.97 | 0.95 | 0.96 |

From Table 5, it can be observed that the highest subjective rating was achieved on Pandora, with an average rating close to 4.3. The ratings from C1 to C4 were around 3.85, which indicates that with the exemplary trial approach, the suggestion qualities were still acceptable and suffer little from the data scales, especially when the scales are large enough (such as C3 and C4). The performance of the playlists in shuffle is the worst as their average ranking is lower than 2. However, an interesting phenomenon was observed in that the standard deviation on the shuffle collection is the smallest, which suggests subjective judgments are more consistent using it. Similarly, the subjects also showed consistent satisfaction for Pandora. While in comparison, such deviations of C1 to C4 are notably higher, which indicate that the suggestion qualities may be improved by applying or refining techniques. For example, a multi-modal approach may be taken that considers at least some metadata or other data.

The above evaluations demonstrate that an exemplary search-based approach can achieve acceptable and stable performance on various scales of music collections while being efficient in practice. As indicated, even for the rudimentary trial system, the general performance is much better than that in shuffle, and is close to the commercial system Pandora.

Pandora was created by the Music Genome project, which aims to "create the most comprehensive analysis of music ever". In the Music Genome project, a group of musicians and music-loving technologists were invited to carefully listen to pieces and label "everything from melody, harmony and rhythm, to instrumentation, orchestration, arrangement, lyrics, and of course the rich world of singing and vocal harmony". Thus, the recommendation of Pandora has integrated both meta-and acoustic-information, as well as human knowledge from music experts. This tends to explain why it achieved the best subjective satisfaction in the trial comparisons. However, Pandora requires a significant amount of manual/expert labeling works, which is expensive and is not available without great difficulty in many applications, such as music recommendations on personal PCs or portable devices.

In comparison, an exemplary search-based single mode acoustic approach can be conveniently deployed to both desktop and web services. Especially for desktop based applications, an exemplary approach can be naturally integrated into a desktop search component, to facilitate search, browsing, and discovery of local personal music resource. Furthermore, if metadata and user listening preferences are available, a multi-modal approach can be taken that improves local acoustic based search results, for example, with CF-based and meta-based information retrieved from the Web. Hence, an exemplary system may be multi-modal and rely on more than acoustic information.

Figure 5:
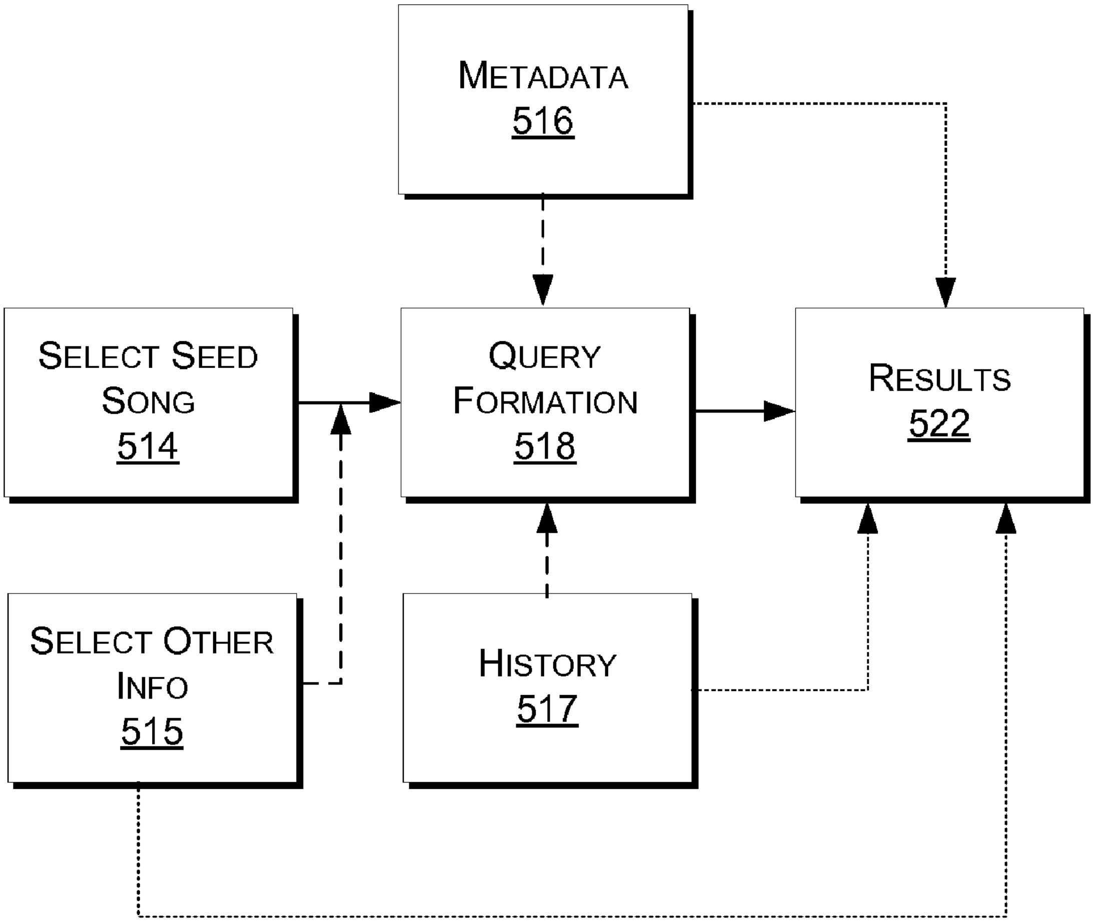
FIG. 5 is a diagram of an exemplary multi-modal method that includes acoustic-based searching augmented by one or more other types of information.

FIG. 5 shows an exemplary multi-modal method 510 that includes various steps of the method 210 of FIG. 2. For example, the method 510 includes a selection block 514 for selecting a seed song, a query formation block 518 for forming a query or queries and a results block 522 for retrieving results based on a query (see, e.g., blocks 214, 218 and 222 of FIG. 2). However, in the example of FIG. 5, one or more additional blocks allow for multi-modal query formation (shown by dashed lines) and/or multi-modal search results (shown by dotted lines). For example, another selection block 515 may allow a user to select additional information for use in query formation and/or retrieval of search results. Such additional information may act to filter results, enhance an acoustic-based search, etc. A metadata block 516 may access metadata about the seed song, for example, via the Internet or other datastore. In turn, such metadata may be used in query formation and/or results retrieval. Another block 517, can introduce information about user history for a particular user or a group of users. For example, a group called "friends" may be relied on to gain information about what friends have been listening to. Alternatively, the history block 517 may track history of a single user of a device (e.g., a portable device, a PC, etc.) and use this information (e.g., user preferences) to enhance performance.

Described herein are various exemplary search-based techniques for scalable music recommendation. In various examples, through acoustic analysis, music pieces are first transformed to sequences of music signatures. Based on such analysis and transformation, an LSH-based scale-sensitive technique can index the music pieces for an effective similarity search.

According to a given data scale, an exemplary method can numerically estimate the appropriate parameters to index various scales of music collections, and thus guarantees that an optimum number of nearest neighbors can be returned in search.

In an exemplary recommendation stage, representative signatures from snippets of a seed piece can be first selected as query terms to retrieve pieces with similar melodies from an indexed dataset. Then, a relevance function can be used to sort the search results by considering criteria like matching ratio, temporal order, term weight, and matching confidence.

An exemplary scheme can generate dynamic playlists using search results.

Trial evaluations for an exemplary system demonstrate performance aspects related to system efficiency, content consistency, and subjective satisfaction for various music collections (e.g., from around 1,000 music pieces to more than 100,000 music pieces).

An exemplary approach optionally, besides using relevance (dynamic) ranking, can implement static ranks such as sound quality. An exemplary approach optionally integrates music popularity information to improve suggestions. Moreover, a system may evaluate more sophisticated acoustic features to discover one or more features that improve or facilitate music recommendation.

An exemplary system may include user preferences, for example, modeled by tracking operational behavior and listening histories.

Figure 6:
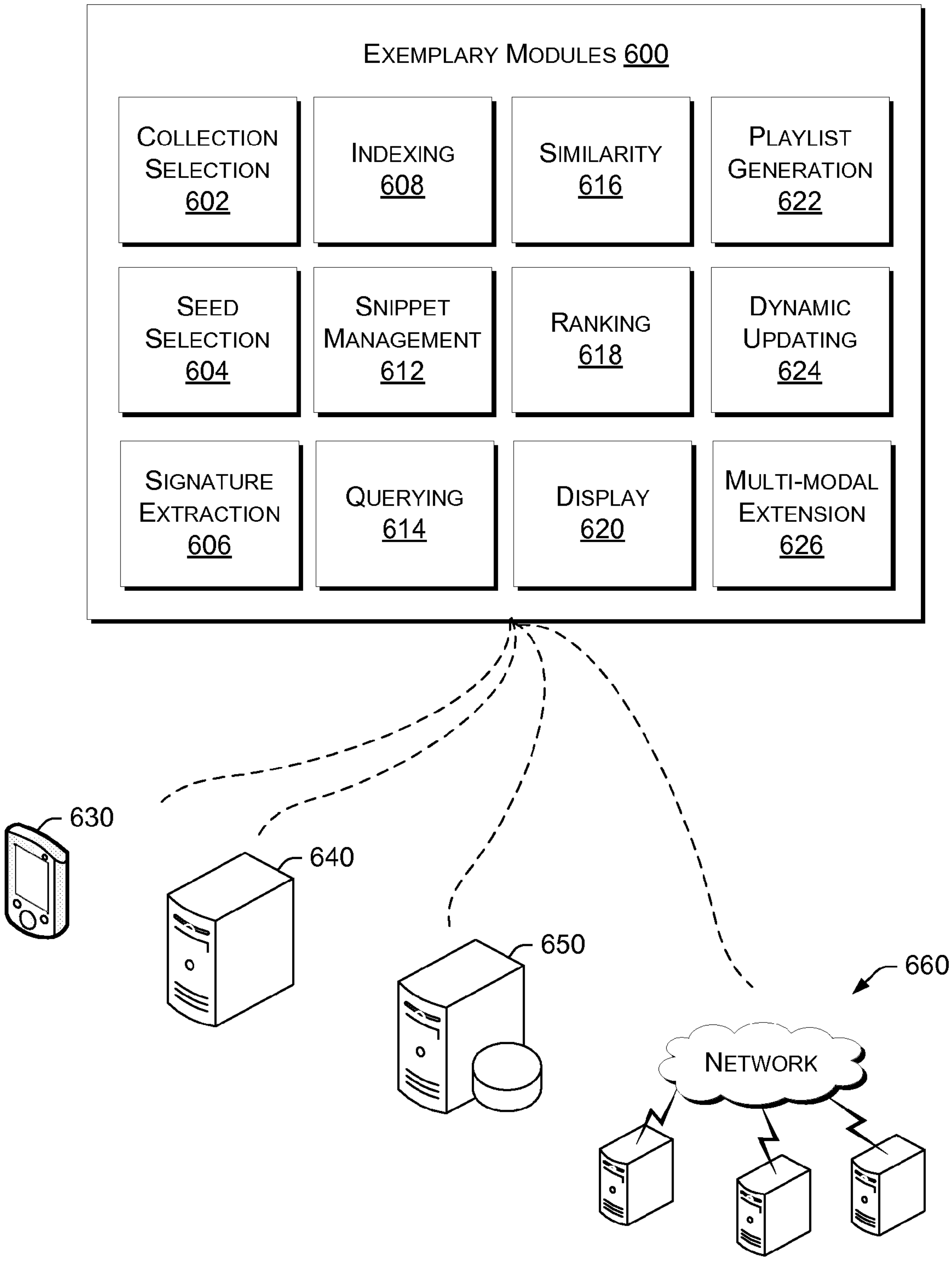
FIG. 6 is a diagram of exemplary modules and computing devices that may operate using one or more of the modules.

As described herein, an exemplary method may be implemented in the form of processor or computer executable instructions. For example, portable music playing devices include instructions and associated circuitry to play music stored as digital files (e.g., in a digital format). Such devices may include public and/or proprietary instructions or circuits to decode information, manage digital rights, etc. With respect to instructions germane to scalable music search, FIG. 6 shows various exemplary modules 600 that include such instructions. One or more of the modules 600 may be used in a single device or in multiple devices to form a system. Some examples are shown as a portable device 630, a personal computer 640, a server with a datastore 650 and a networked system 660 (e.g., where the network may be an intranet or the Internet).

The modules 600 include a collection selection module 602, a seed selection module 604, a signature extraction module 606, an indexing module 608, a snippet management module 612, a querying module 614, a similarity module 616, a ranking module 618, a display module 620 (e.g., for UI 200 of FIG. 2), a playlist generation module 622, a dynamic update module 624 and a multi-modal extension module 626. Various functions have been described above and such modules may include instructions to perform one or more of such functions.

As mentioned, the modules 600 may be distributed. For example, a user may have the PC 640 that performs indexing per the indexing module 608 and the portable device 630 that receives results in the form of a playlist from a playlist generation module 622. The portable device 630 may further include the seed selection module 604 for selecting, storing and communicating one or more selected seed songs to the user's PC 640 for generation of new playlists (e.g., to transfer upon plug-in of or establishment of a communication link between the portable device 630 to the PC 640).

In the example of FIG. 6, the portable device 630 may be a device such as the ZUNE® device (Microsoft Corporation, Redmond, Wash.). For example, such a device may include GB of memory for storing songs, pictures, video, etc. The ZUNE® device is about 40 mm×90 mm×9 mm (w×h×d) and weighs about 1.7 ounces (47 grams). It has a battery that can play music, up to 24 hours (with wireless off) and video, for up to 4 hours; noting a charge time of about 3 hours. The ZUNE® device includes a screen with about a 1.8-inch color display and scratch-resistant glass (e.g., resolution of 320 pixels×240 pixels). With respect to audio support, it includes WINDOWS MEDIA® Audio Standard (WMA) (.wma): Up to 320 Kbps; constant bit rate (CBR) and variable bit rate (VBR) up to 48-kHz sample rate. WMA Pro 2-channel up to 384 Kbps; CBR and VBR up to 48-kHz; and WMA lossless. It includes Advanced Audio Coding (AAC) (.mp4, .m4a, .m4b, .mov)—.m4a and .m4b files without FairPlay DRM up to 320 Kbps; CBR and VBR up to 48-kHz; and MP3 (.mp3)—up to 320 Kbps; CBR and VBR up to 48-kHz. Picture support includes JPEG (.jpg) and video support includes WINDOWS MEDIA® Video (WMV) (.wmv)—Main and Simple Profile, CBR or VBR, up to 3.0 Mbps peak video bit rate; 720 pixels×480 pixels up to 30 frames per second (or 720 pixels×576 pixels up to 25 frames per second). An included module can transcode HD WMV files at device sync. Video support also includes MPEG-4 (MP4/M4V) (.mp4) Part 2 video—Simple Profile up to 2.5 Mbps peak video bit rate; 720 pixels×480 pixels up to 30 frames per second (or 720 pixels×576 pixels up to 25 frames per second). An included module can transcode HD MPEG-4 files at device sync. Video support further includes H.264 video—Baseline Profile up to 2.5 Mbps peak video bit rate; 720 pixels×480 pixels up to 30 frames per second (or 720 pixels×576 pixels up to 25 frames per second). An included module can transcode HD H.264 files at device sync. Yet further video support includes DVR-MS, and a module to transcode at time of sync.

The ZUNE® device includes wireless capabilities (e.g., 802.11 b/g compatible with a range up to about 30 feet). In range, see other ZUNE® device users, see their "now playing" status (when enabled), and can send and receive songs and pictures. Such capabilities allow for a networked configuration such as the system 660 of FIG. 6. Authentication modes include Open, WEP, WPA, and WPA2; and encryption modes include WEP 64- and 128-bit, TKIP, and AES. The ZUNE® device includes a FM radio, a connector port, headphone jack/AV output and can operate in a variety of spoken/written languages.

A user may control a portable device to generate a dynamic playlist by selecting one or more seeds. For example, as shown in FIG. 2, a user may highlight, right-click, etc., a song for use as a seed. In turn, modules in the portable device may form queries and then search an index maintained on the portable device to generate a playlist. Such a playlist may be dynamic as a loop may implement drift, as explained above. While text search may produce identical hits, in music, identity of musical segments is seldom found. However, something may sound similar. As described herein, such similarity can be expressed in the form confidence (e.g., as a confidence level). In turn, search results may be based at least in part on confidence. Further, as described herein, an acoustic-based query is formed by small portions of a song, as opposed to a whole song. A UI such as the UI 200 of FIG. 2 may allow a user to select segments that the user likes. For example, the query pane 204 may display a waveform or other information (e.g., an A-B segment) that allows a user to readily select a portion of a song for use in query formation and search. As mentioned, a user may select a chorus, a rift, a solo, etc. Hence, the user can input quite specific acoustic information for use in searching. After initiation of a search by selection of an initial seed or seeds, a genetic algorithm may continually select new seeds to introduce drift, which may continue for some length of time (e.g., hours, days, etc.).

An exemplary method may also track playlist history. For example, if certain songs have appeared in a certain number of previously generated playlists, these songs may be weighted or filtered to prevent them from being selected for future playlists. Such a method can act to keep generated playlists "fresh".

Various exemplary techniques described herein can be optionally used to efficiently find similar or duplicate songs in a large collection. Various exemplary techniques may be optionally used as a plug-in(s) for WINDOWS MEDIA® player (WMP), for example, for a short clip, to determine which song it is and then to push lyrics to the user or other information about the song (e.g., composer, year he/she lived, etc.). Such information may be acquired by accessing the Internet.

As described herein, various exemplary techniques may be used in on-line or off-line (personal or local) mobile devices. Indexing may execute as a background process (e.g., indexing 3,000 songs in about 4 hours).

As described herein, an exemplary method can estimate parameters in LSH based at least in part on scale of a music collection. For example, an exemplary index can be built using LSH parameter and size of collection information.

Exemplary Computing Device

Figure 7:
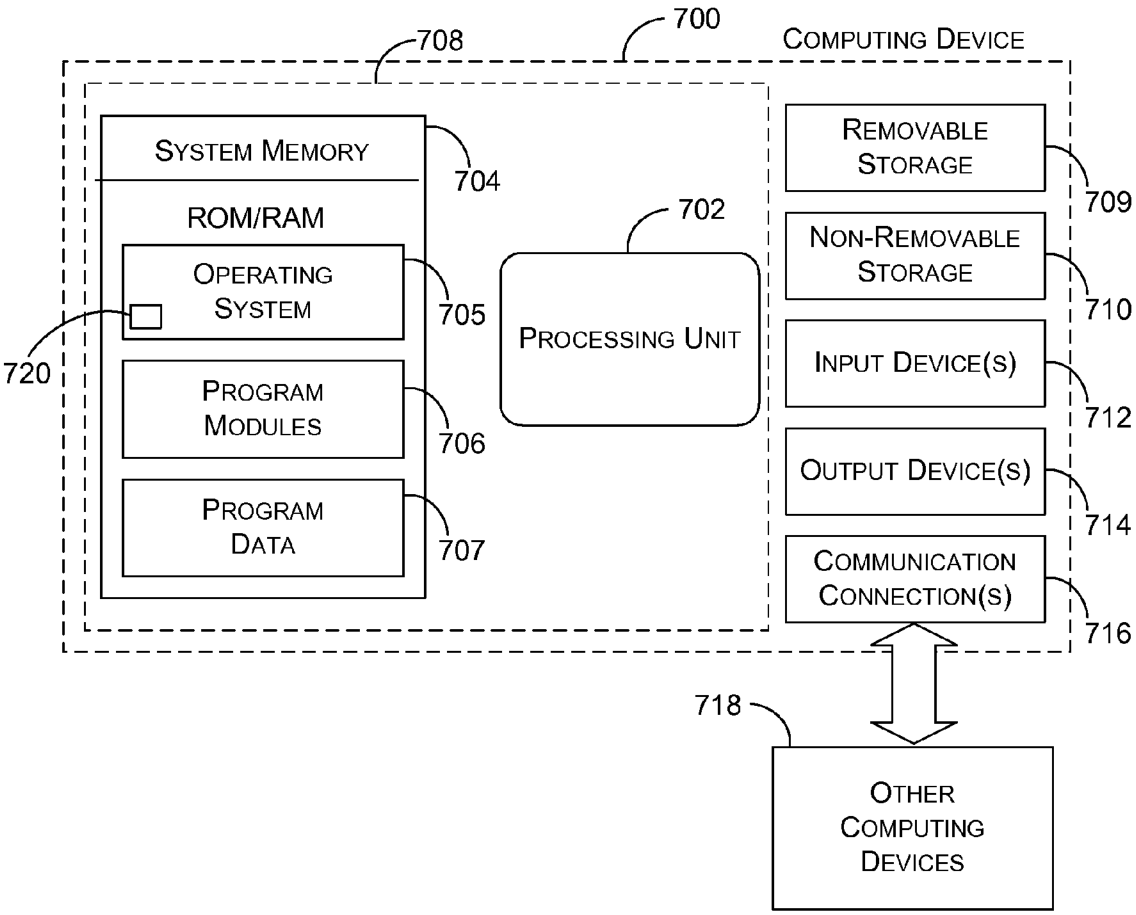
FIG. 7 is a block diagram of an exemplary computing device.

FIG. 7 illustrates an exemplary computing device 700 that may be used to implement various exemplary components and in forming an exemplary system. For example, the computing device 110 of the system of FIG. 1 may include various features of the device 700 and the computing devices or systems of FIG. 6 may include various features of the device 700.

As shown in FIG. 1, the exemplary computing device 110 may be a personal computer, a server or other machine and include a network interface; one or more processors; memory; and instructions stored in memory (see, e.g., modules 600 of FIG. 6).

In a very basic configuration, computing device 700 typically includes at least one processing unit 702 and system memory 704. Depending on the exact configuration and type of computing device, system memory 704 may be volatile (such as RAM), non-volatile (such as ROM, flash memory, etc.) or some combination of the two. System memory 704 typically includes an operating system 705, one or more program modules 706, and may include program data 707. The operating system 705 include a component-based framework 720 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 700 is of a very basic configuration demarcated by a dashed line 708. Again, a terminal may have fewer components but will interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

Computing device 700 may also contain communication connections 716 that allow the device to communicate with other computing devices 718, such as over a network (e.g., consider the aforementioned network of FIG. 6). Communication connections 716 are one example of communication media. Communication media may typically be embodied by computer readable instructions, data structures, program modules, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented at least in part by a computing device, the method comprising:
- providing a music collection of a particular scale;
- determining a distance parameter for locality sensitive hashing based at least in part on the particular scale of the music collection;
- constructing an index for the music collection;
- obtaining a candidate piece of music and extracting acoustic features from the candidate piece of music to form a query;
- retrieving pieces of music from the index of the music collection as search results in response to the query; and
- ranking the search results based on at least one of a matching ratio, a temporal order, a term weight, or a matching confidence.

2. The method of claim 1, wherein the distance parameter comprises a nearest neighbors' distance.

3. The method of claim 1, wherein the determining the distance parameter being based at least in part on a probability density function of a Gamma distribution.

4. The method of claim 1, wherein the determining the distance parameter occurs iteratively.

5. The method of claim 1, wherein the distance parameter comprises a scales sensitive parameter.

6. The method of claim 1, further comprising:
- performing searches of the index of the music collection; and
- providing search results for the searches based on one or more criteria.

7. One or more computer-readable media comprising computer-executable instructions to perform the method of claim 1.

8. A system comprising:
- a memory;
- one or more processors coupled to the memory; and
- modules stored in the memory and executable on the one or more processors, the modules comprising:
  - a collection selection module configured to provide a music collection of a particular scale;
  - a similarity module configured to determine a distance parameter for locality sensitive hashing based at least in part on the scale of the music collection;
  - an indexing module configured to construct an index of the music collection;
  - a signature extraction module configured to obtain a candidate piece of music and to extract acoustic features from the candidate piece of music to form a query;
  - the similarity module further configured to retrieve pieces of music from the index of the music collection as search results in response to the query; and a ranking module configured to rank the search results based on at least one of a matching ratio, a temporal order, a term weight, or a matching confidence.

9. The system of claim 8, wherein the distance parameter comprises a nearest neighbors' distance.

10. The system of claim 8, wherein the distance parameter comprises a scales sensitive parameter.

11. The system of claim 8, wherein the similarity module determines the distance parameter based at least in part on a probability density function of a Gamma distribution.

12. The system of claim 8, wherein the similarity module determines the distance parameter iteratively.

13. The system of claim 8, wherein the modules further comprise:

a seed selection module configured to provide a piece of music as a query for a search; and a playlist generation module configured to provide a recommendation based on search results.

14. The system of claim 8, wherein:

the indexing module is further configured to provide search results based on a query; and the modules further comprise a rank module configured to rank the search results based on one or more criteria.

15. The system of claim 14, wherein the one or more criteria include at least one of a matching ratio, a temporal order, a term weight, or a matching confidence.

16. The system of claim 8, wherein the modules further comprise a playlist generation module configured to generate and to output playlists from search results.

17. The system of claim 8, wherein the modules further comprise a seed selection module configured to select, to store, and to communicate one or more songs beings selected.

* * * * *